United States Patent [19]

Martinek

[11] Patent Number: 4,558,488
[45] Date of Patent: Dec. 17, 1985

[54] SIZE CONTROL SYSTEM FOR AUTOMATIC SAUSAGE STUFFING

[75] Inventor: Thomas W. Martinek, Covington, Ind.

[73] Assignee: Teepak, Inc., Oak Brook, Ill.

[21] Appl. No.: 515,138

[22] Filed: Jul. 19, 1983

[51] Int. Cl.[4] ............................................. A22C 11/02
[52] U.S. Cl. ........................................ 17/41; 17/1 F
[58] Field of Search ................ 17/33, 41, 42, 49, 1 R, 17/1 F; 53/576, 122, 581, 582; 426/513; 113/118.1

[56] References Cited

U.S. PATENT DOCUMENTS

| 2,871,508 | 2/1959 | Hill ........................................ 17/41 |
| 3,396,426 | 8/1968 | Ziolko ................................ 17/41 X |
| 3,454,980 | 7/1969 | Washburn ........................... 17/35 |
| 3,457,588 | 7/1969 | Myles et al. ......................... 17/41 |
| 3,553,769 | 1/1971 | Myles et al. ......................... 17/49 |
| 3,621,513 | 11/1971 | Kupcikevicius ..................... 17/41 |
| 3,748,690 | 7/1973 | Niedecker ........................... 17/33 |
| 4,007,761 | 2/1977 | Beckman ......................... 17/33 X |
| 4,028,775 | 6/1977 | Tysver ................................ 17/49 |
| 4,034,441 | 7/1977 | Kupcikevicius et al. ............ 17/41 |
| 4,044,426 | 8/1977 | Kupcikevicius et al. ............ 17/33 |

FOREIGN PATENT DOCUMENTS 3028831   3/1982   Fed. Rep. of Germany .......... 17/35

Primary Examiner—Willie G. Abercrombie
Attorney, Agent, or Firm—Michael L. Dunn; William J. Crossetta

[57] ABSTRACT

An apparatus for controlling the size of a casing filled with emulsion in an automatic stuffing machine includes a drag member between an outer surface of the stuffing horn and an inner surface of the casing sleeved over the stuffing horn. The drag member has a drag surface. A pressurized fluid system expands the drag member so that the drag surface contacts and exerts a force against the inner surface of the casing in opposition to movement of the casing on the stuffing horn as it is being filled and expanding radially outwardly. A control circuit controls the expansion of the drag member to vary the force applied by the drag surface against the casing inner surface to control the radial expansion of the casing as it is being filled with emulsion. The control circuit may include a feedback system from the portion of the casing expanding radially outward to control the expansion of the drag member in response to casing size.

10 Claims, 4 Drawing Figures

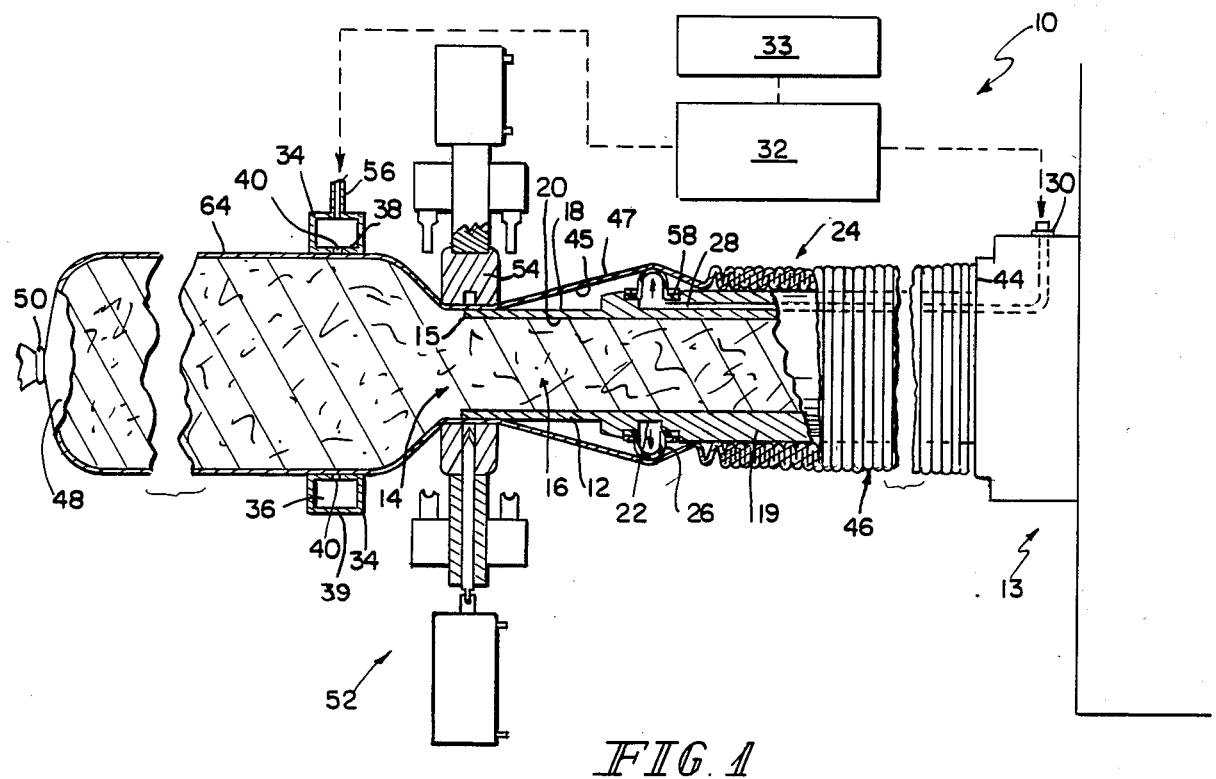
FIG. 1
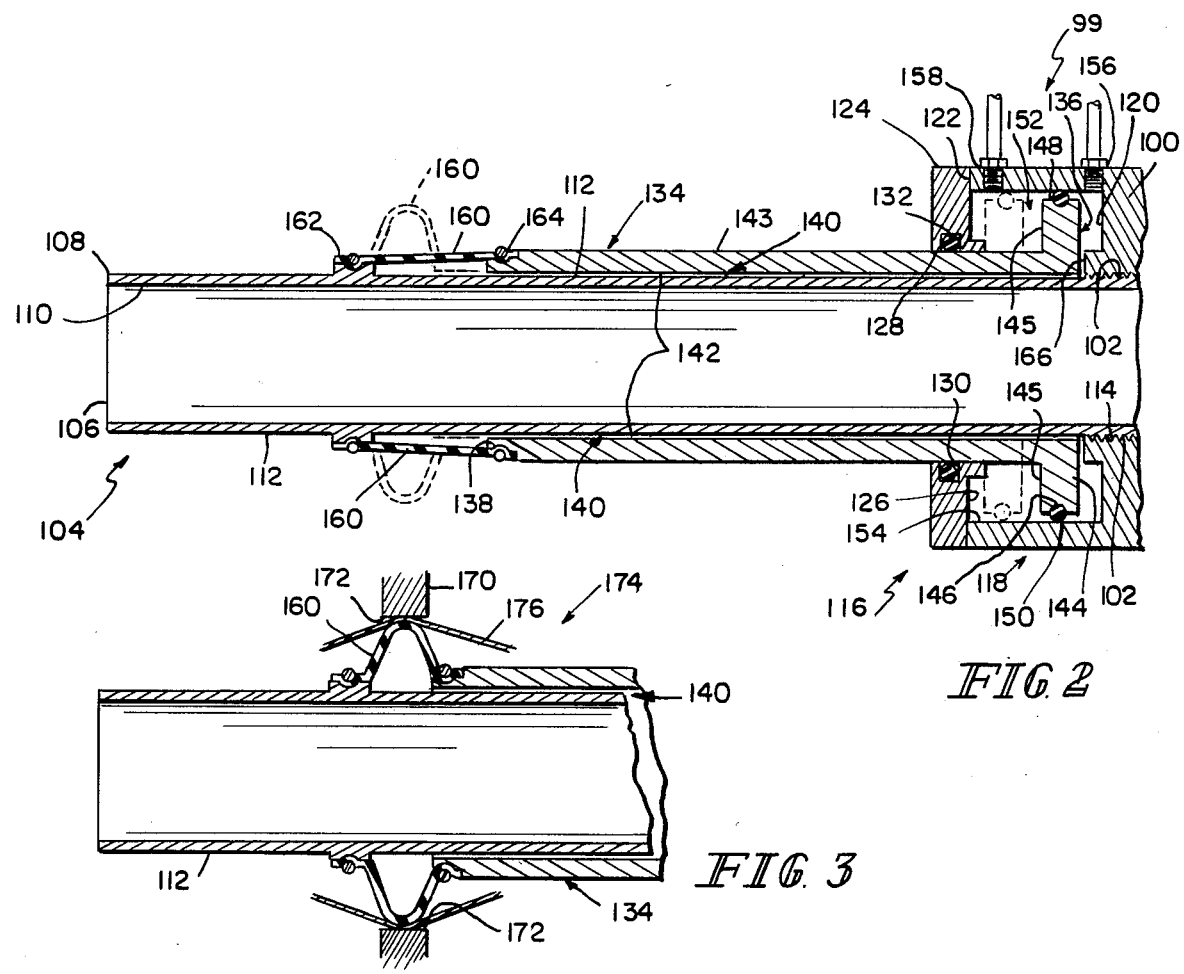
FIG. 2
FIG. 3

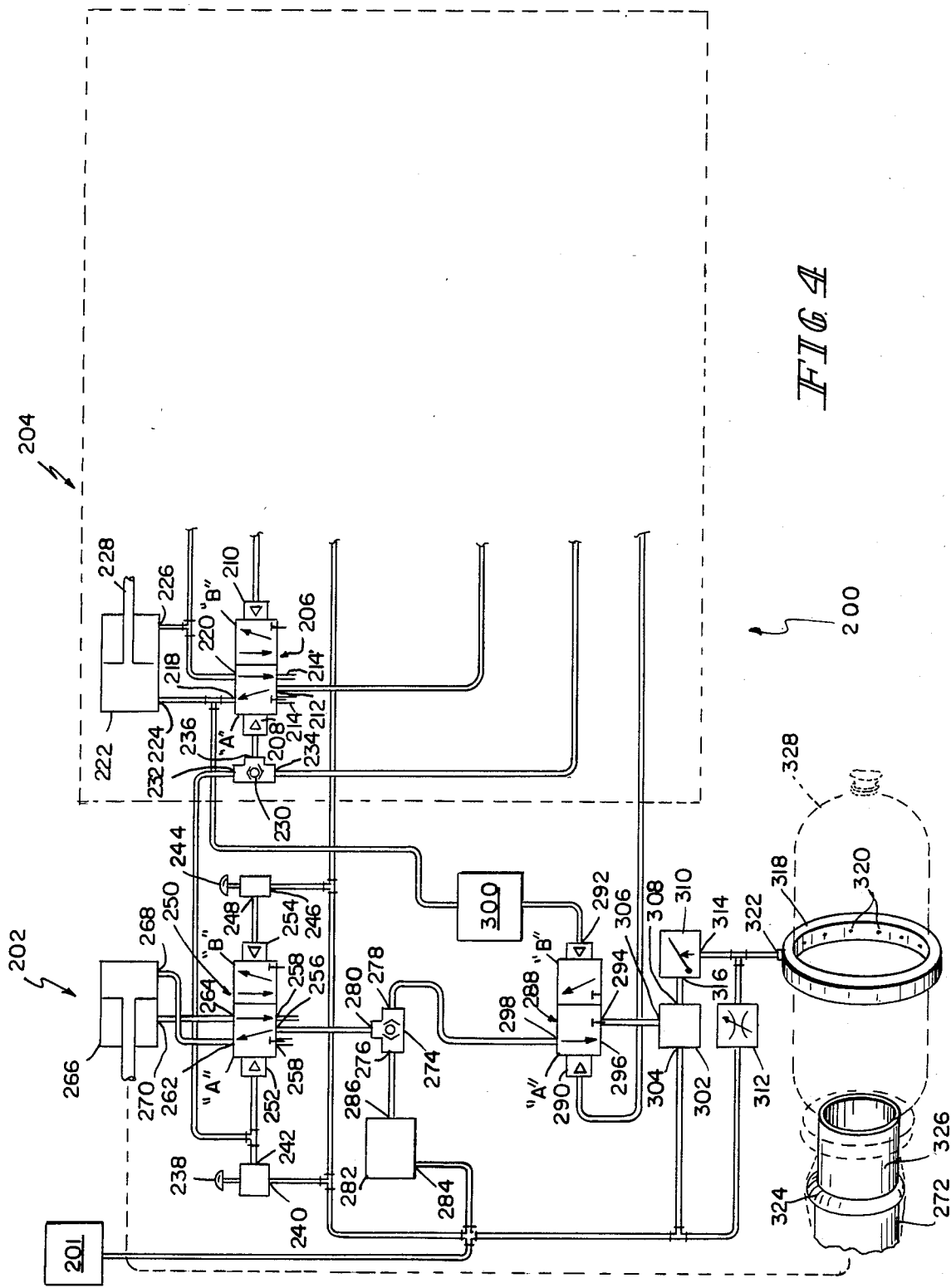

SIZE CONTROL SYSTEM FOR AUTOMATIC SAUSAGE STUFFING

This invention relates to an apparatus for filling a casing that expands as it is filled with an emulsion, and more particularly to an apparatus for controlling the size of the casing as it is being filled by an automatic sausage stuffing machine.

Various techniques are known in the meat packing industry for semiautomatically or automatically filling a casing with a viscous meat emulsion. U.S. Pat. No. 4,044,426 discloses an apparatus and method for automatically filling a shirred casing with a meat emulsion. A shirred casing is a tubular casing length that has been folded and compressed to a length that is much less than its uncompressed length. Typically, the shirred casing will have one end closed by a metal clip or other clamping means, while the other end is left open.

The open end of the shirred casing is fitted over a stuffing horn that is part of the stuffing machine. The emulsion is forced through the stuffing horn into the casing. The emulsion filling the casing forces the closed end of the casing away from the end of the stuffing horn deshirring the casing. As the casing is filled, it expands to its stuffed diameter.

The stuffed casing is processed by the stuffing machine to form a finished product, i.e., emulsion in the casing with both ends closed. The filled casing is then cooked and cured by processes well known. An important aspect of the finished product is a uniform diameter over the entire length of the filled casing. In many cases, the finished cooked product is sliced and packaged into units of predetermined weight and slice count for eventual retail sale. Therefore, to assure an acceptable retail product it is important that the diameter of the stuffed casing be uniform along its entire length. Further, when a casing is understuffed, the resulting product has a distasteful wrinkled appearance. Also, when understuffed, the processed sausage may suffer an emulsion breakdown yielding undesirable pockets of fat or liquid.

Overstuffing the casing can cause the casing to rupture, resulting in costly waste of the product. Further, if the retail product is packaged by slice count, an excessive amount of product would be packaged in the retail unit.

U.S. Pat. No. 4,044,426 discloses a technique of controlling the size of the stuffed casing. This technique utilizes a sizing ring implanted in the shirred casing.

A disadvantage of this technique is that the unstuffed casing with the implanted sizing ring is sold as a unit to the meat packer, and the sizing ring is disposed of after the casing has been stuffed. Another disadvantage of this technique is that the sizing ring must be secured on the machine prior to beginning the stuffing operation and removed after the stuffing operation with a resultant loss of labor. A further disadvantage of this technique is that for the sizing ring to operate properly in conjunction with the automatic stuffing machine, the casing used must have precise size, humidification, and lubrication uniformity. Another disadvantage is that different size rings must be used for each size casing which is stuffed.

Attempts have been made to induce the operators of stuffing machines to use reusable sizing rings. However, since the casing must tightly fit over the sizing ring for it to be effective, it has proven to be a time-consuming operation to attempt to thread a casing over a reusable sizing ring on the stuffing machine. Therefore, reusable sizing rings have not been widely accepted by the meat packing industry.

It is therefore an object of this invention to provide an apparatus for controlling the size of the stuffed casing that can be reused indefinitely.

It is a further object of this invention to provide a size control apparatus that can be used with a variety of different casing sizes.

Another object of this invention is to provide a size control system that need not be mounted and unmounted with each casing.

Yet another object of this invention is to provide a size control apparatus that permits the casing to be easily mounted on the machine, yet effectively control the size of the stuffed casing.

It is a further object of this invention to provide a size control apparatus that can sense and control the size of the casing as it is being stuffed to obtain a finished product having a uniform diameter over its entire length.

Another object of this invention is to provide a size control system that can utilize a shirred casing that does not require the preciseness of size, humidification, and lubrication of conventional systems.

According to an illustrative embodiment of the invention, an apparatus for controlling the size of a casing filled with emulsion in an automatic stuffing machine includes a drag member between an outer surface of the stuffing horn and an inner surface of the casing sleeved over the stuffing horn, the drag member having a drag surface, means for expanding the drag member so that the drag surface contacts and exerts a force against the inner surface of the casing in opposition to movement of the casing on the stuffing horn as it is being filled and expanding radially outwardly, and a control means for controlling the expansion of the drag member to vary the force applied by the drag surface against the casing inner surface, thereby to control the radial expansion of the casing as it is being filled with emulsion.

Further according to the present invention, the control means includes feedback means for controlling the expansion of the drag member in response to the radial expansion of the casing to control the size of the casing.

Additional features and advantages of the invention will become apparent to those skilled in the art upon consideration of the following detailed description of one embodiment exemplifying the best mode of carrying out the invention as presently perceived. The detailed description particularly refers to the accompanying figures in which:

FIG. 1 is a side view, partly broken away and partly cross-sectional, of one embodiment of the present invention;

FIG. 2 is a cross-sectional view of another embodiment of the present invention;

FIG. 3 is a fragmentary view of FIG. 2 showing the invention in the operational mode and showing yet another embodiment using an annular snubbing ring; and FIG. 4 is a schematic diagram of a feedback control system embodying the present invention.

The present invention relates to controlling the size of a shirred casing as it is filled with a viscous emulsion. Although not limited to automatic sausage stuffing machines, the present invention would be particularly useful in automatic sausage stuffing machines of the type disclosed in U.S. Pat. No. 4,044,426. The present invention is herein described with reference to only those portions of such automatic sausage stuffing machines needed to clearly show the embodiments of the invention.

Referring to FIG. 1, an automatic stuffing machine 10 has a frame 13 for holding a stuffing horn 12. Stuffing horn 12 has an axially outer end 15 with an outlet 14. Stuffing horn 12 further has an axially inner end (not shown) having an emulsion inlet (not shown). Stuffing horn 12 is mounted on frame 13 in any conventional manner. Stuffing horn 12 further includes an outer surface 18 and an inner surface 20 with a wall 19 between the outer surface 18 and the inner surface 20.

Automatic sausage stuffing machine 10 further includes a snubbing, clipping, and severing mechanism 52 located generally at outlet 14 of stuffing horn 12. Mechanism 52 has an annular ring 54. Mechanism 52 operates in a manner well known such as is described in U.S. Pat. No. 4,044,426.

Shirred casing 46 has an open end 44 and a closed end 48 which may be tied or clipped closed by a metal ring 50. Shirred casing 46 has semi-elastic properties and expands slightly as it is filled with a viscous meat emulsion 16.

A size control means 24 includes annular cavity 22 formed in the wall 19 of stuffing horn 12 generally in proximity to the axially outer end 15 of stuffing horn 12. Cavity 22 encircles wall 19 and extends partway through the wall 19 from the outer surface 18. An annular drag member 26 formed of an expandable elastomer sealably encloses cavity 22. Annular member 26 is sealably fastened to the outer surface 18 of the stuffing horn 12 on both sides of the cavity 22.

An air pressure passage 28 is also formed in the wall 19 of stuffing horn 12 between the outer surface 18 and the inner surface 20. Pressure passage 28 extends longitudinally through the wall 19 of the stuffing horn 12 from the annular cavity 22 to generally the axially inner end of the stuffing horn 12. Alternatively, passage 28 could be a small tube attached to the inside of the horn 12. A pressure port 30 is mounted on frame 13 and the pressure passage 28 further extends radially outward through the wall 19 of stuffing horn 12 and through the frame 13 to couple the pressure port 30 to the annular cavity 22.

In the embodiment described to this point, the simplest form of the invention may be practiced. In this embodiment, no size measuring and feedback system is used. Such a system embodying the present invention will be described in conjunction with the description of further illustrative embodiments of the invention.

In a further embodiment of the present invention, the size control means 24 includes an annular sizing ring 34 which is mounted on the automatic stuffing machine 10 in any conventional manner. Sizing ring 34 is located in spaced relationship to the outlet 14 of the stuffing horn 12 and is generally coaxial to a line congruent with the longitudinal axis of the stuffing horn 12 which extends axially outwardly from the outlet 14. In the illustrative embodiment, sizing ring 34 is mounted downstream on the snubbing, clipping, and severing mechanism 52.

Sizing ring 34 has a hollow chamber 36 circumferentially formed between an inner wall 38 and an outer wall 39 of the sizing ring 34. A plurality of orifices 40 extend radially through the inner wall 38. In the illustrative embodiment, there are at least three orifices 40.

A pressure feedback tube 56 is coupled to the hollow chamber 36 through the outer wall 39. The pressure feedback tube 56 couples the hollow chamber 36 to the pressure controller 32.

Operation of the size control means 24 can best be described by referring to FIG. 1. Snubbing, clipping, and severing mechanism 52 is moved axially away from outlet 14 in a manner similar to that described in U.S. Pat. No. 4,044,426. Pressure controller 32 vents pressure passage 28 to atmosphere, depressurizing cavity 22, allowing annular drag member 26 to deflate.

Shirred casing 46 is sleeved over stuffing horn 12. The closed end 48 of the shirred casing 46 is immediately adjacent to the stuffing horn's outlet 14. A small portion of the shirred casing 46 immediately adjacent the closed end 48 is unshirred so that an unshirred length of casing extends beyond the stuffing horn's outlet 14.

As the shirred casing 46 is sleeved over the annular drag member 26, elastomer drag member 26 is depressed by either vacuum or natural contraction into the annular cavity 22, facilitating the passage of shirred casing 46 over annular member 26. However, it is not necessary that the annular member 26 be able to be received into the cavity 22 for the apparatus to work, only that the shirred casing 46 pass easily over the annular member 26. It should be recognized that the pressure controller 32 could couple the pressure passage 28 to a vacuum source (not shown) to forcibly contact the annular member 26 to facilitate the passage of shirred casing 46 over the annular member 26.

Next, mechanism 52 is moved axially inward using conventional means (not shown) so that annular ring 54, which has a diameter slightly larger than the diameter of stuffing horn 12, is located around the unshirred portion of shirred casing 46 which surrounds the stuffing horn 12 adjacent the outlet 14. Annular ring 54 is located neare annular member 26 and the axial outer end 15 of the stuffing horn 12.

Pressure controller 32 controllably couples a source of compressed air 33 to the pressure passage 28 to pressurize cavity 22, thereby causing annular drag member 26 to expand to contact the inner surface 45 of the shirred casing 46, and causing the casing to expand and stretch to a predetermined size. A low-volume source 33 of high-pressure compressed air from source 33 is coupled to the hollow chamber 36 of the sizing ring 34 through the pressure feedback tube 56. It should be recognized that it is not necessary to couple the low-volume compressed air to the hollow chamber 36 through the pressure feedback tube 56. The low-volume compressed air could be coupled directly to the hollow chamber 36 through the outer wall 39 in any conventional manner. The flow of the low-volume compressed air must be sufficiently low so that when the orifices 40 are not blocked and the air flows freely through the orifices 40, there is not enough of a pressure drop across the orifices 40 to permit a pressure build-up in the hollow chamber 36. Conversely, when the orifices 40 are partially blocked, there must be a rapid corresponding pressure increase in the hollow chamber 36.

In the illustrative embodiment, the pressure controller 32 supplies compressed air at a regulated starting pressure to the pressure passage 28 which inflates the annular member 26 to an initial starting size. The viscous emulsion 16 is forced under pressure into the inlet of stuffing horn 12 by the automatic sausage stuffing machine 10. Stuffing horn 12 directs the pressurized emulsion 16 through its outlet 14 against the inner surface 45 of the closed end 48 of the shirred casing 46. The pressure of the emulsion 16 acting against closed end 48 forces the closed end 48 axially outwardly away from the outlet 14 of the stuffing horn 12. As the closed end 48 is forced axially outwardly away from outlet 14, the inner surface 45 of shirred casing 46 is dragged across the pressurably expanded annular member 26 and the shirred casing's outer surface 47 is dragged through the annular ring 54. As the inner surface 45 is dragged across the annular drag member 26, a force of friction opposing the movement of the casing is generated. This friction force is related to the surface area of the annular drag member 26 which contacts the inner surface 45 of the casing and the contact pressure which results from stretching the casing. The greater the degree of pressurization, the larger the size the annular drag member will be inflated to, thereby increasing the surface area being forced against the stretched inner surface 45 of the shirred casing 46, increasing the friction force opposing the movement of the casing 46. The larger the friction force opposing the casing 46 movement, the greater the force the emulsion must exert to cause the casing 46 to move. The greater the emulsion force exerted on the inner surface 45 of the filled portion 64 of shirred casing 46, the larger the size of the filled casing. At this juncture, a filled portion 64 of shirred casing 46 has not yet passed through sizing ring 34 so the size of the filled portion 64 is determined by the initial size that the annular member 26 is expanded to.

After the filled portion 64 of casing 46 begins to pass through sizing ring 34, the size control means 24 controls the size of the portion 64 of casing 46 being filled. Pressure controller 32 senses the pressure in hollow chamber 36 of the sizing ring 34. Pressure controller 32 controls the pressure of the compressed air pressurizing cavity 22 through pressure passage 28 based upon the sensed pressure. Assuming the filled portion 64 is undersized, it will not have expanded sufficiently to force the outer surface 47 against the orifices 40. With orifices 40 unblocked, the low-volume compressed air will flow freely out of the hollow chamber 36, thereby causing the pressure in hollow chamber 36 to be relatively low.

Pressure controller 32 will sense the relatively low pressure of hollow chamber 36 through pressure feedback tube 56 and increase the pressure of the compressed air pressurizing cavity 22 through the pressure passage 28. The increased pressure in cavity 22 will inflate annular member 26 to a larger size, thereby increasing both the surface area of the annular drag member 26 contacting the inner surface 45 of casing 46 and the force exerted by the annular drag member 26 against the casing's inner surface 45. Consequently, the friction force opposing the movement of the casing is increased, causing the emulsion 16 to exert a greater force in filling the casing 46, thereby causing the size of the filled portion 64 to be larger.

As the filled portion 64 of casing 46 increases in size, the outer surface 47 of the filled portion 64 is brought into proximity to the orifices 40. Three or more orifices 40 are recommended to compensate for any variations in casing size caused by non-uniformities in the filled casing or variations in the casing location. The outer surface 47 begins to block the low-volume compressed air flowing out of the hollow chamber 36, causing the pressure in the hollow chamber 36 to increase. Pressure controller 32 senses the increased pressure in hollow chamber 36 and decreases the pressure of the compressed air pressurizing cavity 22. The decrease in pressure in the cavity 22 deflates annular member 26 somewhat, thereby decreasing both the surface area of the annular member 26 contacting the inner surface 45 of the casing 46 and the force exerted by the annular member 26 against the casing's inner surface 45. The opposing friction force is decreased, causing the emulsion 16 to exert less force in filling the casing 46, resulting in a decrease in the size of the filled casing portion 64.

In its simplest form, the size control system 24 uses a simple hand-set pressure regulator as the pressure controller 32. No sizing ring 34 and associated air components are used. Instead, the stuffed product size is measured by hand and the regulator 32 is set to make the correction needed. In this simplest form, the expandable annular drag member 26 takes the place and function of the sizing ring described in U.S. Pat. No. 4,044,426. However, in the present invention, the size of the drag member can be changed by adjustment of the pressure regulator. Also, it is not necessary to remove the inflatable drag member, merely to collapse it, to use the next strand.

Referring now to FIG. 2, another illustrative embodiment of the present invention is shown.

An automatic sausage stuffing machine 99 has a base 100 having a threaded cylindrical hole 102 extending axially inward therethrough. Machine 99 further includes a stuffing horn 104 having a threaded axially inner end 114 providing an inlet and an outlet 106 in an axially outer end 108. Horn 104 further has an inner surface 110 and an outer surface 112. The axially inner end 114 is threadably received in the cylindrical hole 102 so that the horn 104 is mounted to the base 100 by threadably tightening it into the threaded cylindrical hole 102. When the horn 104 has been threadably mounted to base 100, a substantial portion of the horn 104 extends axially outward from the base 100.

A size control means 116 includes a cylindrical extension 118 of base 100 having an axially outer surface 122 in spaced relationship to the axially outer wall 120 of the base 100. The extension 118 encircles the horn 104 in spaced relationship to the outer surface 112 of the horn 104, forming a cylindrical chamber 152. Size control means 116 further includes a seal plate 124 having a central opening for receiving the horn 104. Seal plate 124 has an inner surface 126 and an annular inner wall 128. An annular chamber 130 is formed in the annular inner wall 128 of seal plate 124 for receiving an O-ring 132. O-ring 132 seats against the outer surface 143 of sleeve 134 providing a seal.

Size control means 116 further includes a sleeve 134 journalled onto horn 104. Sleeve 134 has an outer surface 143, an axially inner end 136, and an axially outer end 138. The inner diameter of the sleeve 134 is slightly greater than the outer diameter of the horn 104 so that when the sleeve 134 is journalled onto the horn 104, an annular pressure passage 140 is formed between an inner surface 142 of the sleeve 134 and the outer surface 112 of the horn 104.

Sleeve 134 has an annular flange 144 extending radially outward at the axially inner end 136 of the sleeve. Annular flange 144 has an annular chamber 146 formed in a radially outwardly facing wall 148 for receiving an O-ring 150. O-ring 150 seats against the extension 118 providing a seal.

Sleeve 134 is journalled onto the horn 104 so that the annular flange 144 of the sleeve 134 is movable within the cylindrical chamber 152. O-ring 150 forms a seal between the radially outwardly facing wall 148 of the annular flange 144 and a radially inwardly facing surface 154 of the cylindrical extension 118 of the base 100.

The cylindrical hole extending through the center of the seal plate 124 has a diameter slightly larger than the outside diameter of the sleeve 134. Seal plate 124 is secured on the cylindrical extension 118 so that the surface 126 sealably engages the axial outer surface 122 of the cylindrical extension 118. O-ring 132 seals the annular inner wall 128 of the seal plate 124 to the outer surface 143 of the sleeve 134. The cylindrical chamber 152, the seal plate 124, and the axial outer wall 120 of the base 100 form a cylinder wherein the annular flange 144 of the sleeve 134 acts as a piston.

Cylindrical extension 118 further has a pressure port 156 passing through it into the cylindrical chamber 152 between the axially inner end 136 of sleeve 134 and the axially outer wall 120 of the base 100. Cylindrical extension 118 also includes a pressure port 158 passing through the cylindrical extension 118 into the cylindrical chamber 152 between an axially outwardly facing surface 145 of the sleeve's annular flange 144 and the inner surface 126 of the seal plate 124. Pressure ports 156 and 158 are coupled to a pressure controller (not shown). An illustrative embodiment of a pressure controller is described later.

Size control means 116 further includes an annular drag member 160 constructed of an expandable elastomer having an axially outer end 162 and an axially inner end 164. Axially outer end 162 is sealably fastened to the outer surface 112 of the horn 104 and the axially inner end 164 is sealably fastened to the outer surface 143 of the sleeve 134. An inner surface 168 of the annular drag member 160 is coupled through the pressure passage 140 to pressure port 156.

In operation, the pressure port 156 is vented to atmosphere, depressurizing the annular drag member 160, and the pressure port 158 is pressurized by the pressure controller (not shown). Annular flange 144 is forced axially inward until it contacts a stop 166 extending axially outwardly from the axially outer wall 120 of the base 100. When flange 144 engages stop 166, axially outer end 138 of the sleeve 134 is forced axially inward which in turn pulls the axially inner end 164 of the annular drag member 160 axially inward so that drag member 160 is pulled essentially flush with the outer surface 112 of the horn 104 as shown by the solid lines in FIG. 2.

A shirred casing (not shown) is sleeved over the stuffing horn 104, the drag member 160, and the sleeve 134. Pulling drag member 160 against the outer surface 112 of the horn 104 facilitates the placement of the shirred casing over the horn 104, the drag member 160, and the sleeve 134. Pressure port 158 is now vented to the atmosphere and pressure port 156 is pressurized by the pressure controller, thereby inflating the drag member 160. When pressure port 156 is pressurized, the annular flange 144 of the sleeve 134 is forced axially outward, thereby causing the sleeve 134 to move axially outward. The axially outer end 138 of the sleeve 134 moves the axially inner end 164 of the drag member 160 axially outward, thereby facilitating drag member 160 to be formed by air pressure through annular passage 140 into the warped position shown by the dotted lines in FIG. 2. At this juncture, the size control means 116 operates in essentially the same manner as the size control means 24 described in FIG. 1.

Referring now to FIG. 3, a modification of the embodiment in FIG. 2 is shown. The modification is an annular reaction ring 170 having an inner surface 172. Reaction ring 170 is mounted by conventional means concentrically about the drag member 160 so that the inner surface 172 is in spaced relationship to the drag member 160 when the drag member 160 has been pulled flush with the surface of the horn 104, as shown by the solid lines in FIG. 2. Reaction ring 170 provides an increased element of frictional force opposing the movement of a shirred casing 174 as it is being filled. An outer surface 176 of the shirred casing 174 is forced against the inner surface 172 of the reaction ring 170 by the drag member 160 when the drag member 160 has been pressurably expanded. Therefore, the movement of the shirred casing 174 will create additional friction between the outer surface 176 and the surface 172 opposing the movement of the shirred casing 174. The use of the reaction ring 170 permits size control to be accomplished without fully expanding the drag member 160 since the opposing frictional force is created by forcing the shirred casing 174 against the reaction ring 170.

In FIG. 4, a pneumatic control system 200 for the invention embodied in FIGS. 2 and 3 is shown. It will be appreciated that, with slight modifications, the control system 200 may also be adapted to control the embodiment shown in FIG. 1.

Control system 200 includes a source of compressed air 201, a size pneumatic control circuit 202, and a machine pneumatic control circuit 204. Machine control circuit 204 controls the operation of the automatic stuffing machine 100 (FIG. 2) employing circuit elements known in the art. Only the portions of the machine control circuit 204 pertinent for a clear understanding of the operation of the invention are shown and described.

Machine control circuit 204 includes a four-way, two-position pilot-operated valve 206 having two pilots 208 and 210, a pressure port 212, an exhaust port 214, and two cylinder ports 218 and 220. The machine control circuit 204 further includes an emulsion valve cylinder 222 having two ports 224 and 226 and a cylinder shaft 228. Machine control circuit 204 further includes a shuttle valve 230 having two input ports 232 and 234 and an output port 236.

Emulsion valve cylinder port 224 is coupled to the cylinder port 218 of the pilot valve 206 and the emulsion valve cylinder port 226 is coupled to the cylinder port 220 of the pilot valve 206. The cylinder ports 220 and 226 are also coupled to the remaining elements of the machine control circuit 204 (not shown). Emulsion valve cylinder shaft 228 is coupled to an emulsion valve (not shown) of the stuffing machine 100.

Pressure port 212 of the pilot valve 206 is coupled to the source of compressed air 201. Exhaust port 214 of the pilot valve 206 is coupled to atmosphere in any conventional fashion.

Pilot 208 of the pilot valve 206 is coupled to the output port 236 of the shuttle valve 230 and the pilot 210 of the pilot valve 206 is coupled to the remaining elements of the machine control circuit 204 (not shown). The input port 234 of the shuttle valve 230 is also coupled to the remainder of the machine control circuit 204.

Size control circuit 202 includes a spring-return start push-button 238 having an input port 240 and an output port 242 and a spring-return drag member collapse push-button 244 having an input port 246 and an output port 248. Size control circuit 202 further includes a four-way, two-position pilot-operated valve 250 having two pilots 252 and 254. Pilot valve 250 further has a pressure port 256, an exhaust port 258, and two cylinder ports 262 and 264. Also included as part of the size control circuit 202 is a sleeve cylinder 266 having an axially outer end 272. Sleeve cylinder 266 is the same as the sleeve 134 described in FIG. 2. Sleeve cylinder 266 has a port 268 which is the same as the pressure port 156 in FIG. 2 and a port 270 which is the same as the pressure port 158 in FIG. 2.

Input port 240 of the start button 238 is coupled to the compressed air source 201 and its output port 242 is coupled to the pilot 252 of the pilot valve 250 and to the input port 232 of the shuttle valve 230. The input port 246 of drag member collapse button 244 is coupled to the compressed air source 201 and its output port 248 is coupled to the pilot 254 of the pilot valve 250. Cylinder port 262 of the pilot valve 250 is coupled to the port 268 of sleeve cylinder 266. Exhaust port 258 of the pilot valve 250 is coupled to atmosphere in a conventional way.

Size control system 202 further has a shuttle valve 274 having two input ports 276 and 278, and an output port 280. Size control system 202 also includes a pressure regulator 282 having an input port 284 and an output port 286.

The input port 284 of the pressure regulator 282 is coupled to the compressed air source 201 and its output port 286 is coupled to the input port 276 of the shuttle valve 274. Output port 280 of the shuttle valve 274 is coupled to the pressure port 256 of pilot valve 250.

Size control circuit 202 also includes a three-way, two-position, pilot-operated delay valve 288 having two pilot inputs 290 and 292, a pressure port 294, an exhaust port 296, and an output port 298. Delay valve 288 also has a delay control circuit 300.

The output port 298 of delay valve 288 is coupled to the input port 278 of the shuttle valve 274. Pilot 290 of the delay valve 288 is coupled to the machine control circuit 204. Pilot 292 of the delay valve 288 is coupled to the cylinder port 218 of the pilot valve 206 through the delay circuit 300. Exhaust port 296 of the delay valve 288 is coupled to atmosphere in a conventional fashion.

Size control circuit 202 includes a reversing relay 302 having a pressure input port 304, an output port 306, and a control port 308. Also included is a pressure amplifier 310 and a flow restrictor 312 such as a needle valve or small orifice. Pressure amplifier 310 has an input port 314 and an output port 316.

Size control circuit 202 further includes annular sizing ring 318 having a plurality of orifices 320 and a pressure port 322. Sizing ring 318 is the same as sizing ring 34 described in FIG. 1.

The pressure port 322 of the sizing ring 318 is coupled to the input port 314 of the pressure amplifier 310 and to the source of compressed air 201 through the flow restrictor 312. The output port 316 of the pressure amplifier 310 is coupled to the control input 308 of the reversing relay 302. Pressure input port 304 of the reversing relay 302 is coupled to the source of compressed air 201 and its output port 306 is coupled to the pressure port 294 of the delay valve 288.

Size control circuit 202 further includes an annular drag member 324 constructed of expandable elastomer having one end sealably fastened to the axial outer end 272 of the sleeve cylinder 266 and its other end sealably fastened to a stuffing horn 326. The arrangement of the drag member 324, the sleeve 266, and the horn 326 is the same as that described in detail in FIG. 2.

For purposes of clarity, the operations of the two-position pilot valves and the shuttle valves are described. A two-position valve, such as the pilot valve 250, has two positions in which air flows between the input ports (pressure and exhaust ports) and the output ports (cylinder ports). Typically, the two positions are indicated by "A" and "B". When pilot pressure is applied to the pilot for the "A" position, in this case to the pilot 252, the valve shifts so that the flow of air takes place in the directions indicated by the arrows in the block labelled "A". In the "A" position, input port 256 is coupled to cylinder port 262 and cylinder port 264 is coupled to exhaust port 258. When pilot air is removed from the "A" pilot and applied to the "B" pilot, in this instance to the pilot 254, the valve shifts to its "B" position and the air flow occurs in the manner indicated by the arrows in the "B" block. In the "B" position, input port 256 is coupled to cylinder port 264 and cylinder port 262 is coupled to exhaust port 258.

A shuttle valve connects one of its two input ports to its output port. The input port connected is the one which has the higher pressure. Illustratively using shuttle valve 274, if the pressure at the input port 276 is higher than the pressure at the input port 278, input port 276 will be connected to the output port 280. Conversely, if the pressure at the input port 278 is higher than the pressure at the input port 276, input port 278 will be connected to the output port 280.

Prior to the beginning of the sausage stuffing operation, pilot valves 250 and 206 will be in their "B" positions. Consequently, emulsion valve cylinder 222 will be retracted so that emulsion is not being forced into stuffing horn 326 and sleeve cylinder 266 will be retracted, deflating the drag member 324 and pulling it flush to the surface of stuffing horn 326 as described in the discussion pertaining to the embodiment of the invention shown in FIG. 2.

A shirred casing 328 is placed over horn 326, the drag member 324, and the sleeve cylinder 266. Start button 238 is now momentarily depressed which couples compressed air source 201 to the pilot 252 of the pilot valve 250 and to the input port 232 of the shuttle valve 230. The compressed air applied to the pilot 252 causes the pilot valve 250 to shift to its "A" position. Delay valve 288 is in its "A" position at this point so the input port 278 of the shuttle valve 274 is vented to atmosphere through the delay valve 288. Input port 276 of the shuttle valve 274 is connected to compressed air provided through regulator 282 from the compressed air source 201 at a pressure determined by the regulator 282. Since the regulated pressure at the input port 276 will be higher than the atmospheric pressure at the input port 278, shuttle valve 274 will be shifted to connect the regulated compressed air to the pressure port 256 of the pilot valve 250. Since pilot valve 250 has been shifted to its "A" position, the regulated compressed air will be coupled to port 268 of the sleeve cylinder 266 through the pilot valve 250, and port 270 of sleeve cylinder 266 will be connected to atmosphere through the exhaust port 258 of the pilot valve 250.

The compressed air at the port 268 of sleeve cylinder 266 causes the sleeve cylinder 266 to move axially outward and pressurably inflate the drag member 324 in the same manner as discussed in FIG. 2. Drag member 324 will expand to a size determined by the pressure of the regulated compressed air.

Simultaneously, the pressure of the compressed air provided at the input port 232 of the shuttle valve 230 through the start button 238 will exceed the atmospheric pressure at the input port 234 (determined by the portion of the machine control circuit 204 not shown) so that the shuttle valve 230 shifts to connect the compressed air at the input port 232 to the pilot 208 of the pilot valve 206. The compressed air at the pilot 208 causes pilot valve 206 to shift to its "A" position, thereby connecting the compressed air source 201, which is coupled to pressure port 212 of the pilot valve 206, to the port 224 of the emulsion valve cylinder 222. Port 226 of the emulsion valve cylinder 222 will be connected to atmosphere through the exhaust port 214 of the pilot valve 206.

Pressurizing port 224 and venting port 226 causes the emulsion valve cylinder 222 to extend its shaft 228 which opens the emulsion valve (not shown) of the stuffing machine 100. A viscous meat emulsion is thereby pressurably forced into stuffing horn 326 which directs it into the shirred casing 328.

The shirred casing 328 is expanded by the emulsion filling it and is forced to move away from the stuffing horn 326. The movement of the casing 328 over the expanded drag member 324 creates a friction force resisting the movement of the casing 328 in the same manner as was described in FIG. 1. This resistive force requires that the emulsion exert a higher force in filling the casing, forcing it to expand more. Since the size of the expanded drag member 324 is determined by the pressure of the regulated compressed air from the regulator 282, the initial size of the expanded casing will be determined by the setting of the regulator 282. In the illustrative embodiment, regulator 282 is adjusted so that the size of the expanded casing is somewhat smaller than the desired size. This permits the expanded casing to pass through annular sizing ring 318.

When the pilot valve 206 shifted to its "A" position, the compressed air source 201 is connected to pilot 292 of the delay valve 288 through delay circuit 300. Delay circuit 300 prevents the compressed air from being applied to pilot 292 for the period of time that the delay circuit 300 was set for. This delay time period allows the shirred casing 328 to begin to move through the annular sizing ring 318 before the size of the filled casing 328 is controlled. After the time period set in the delay circuit 300 expires, compressed air is applied to pilot 292, causing delay valve 288 to shift to its "B" position.

The pressure at the pressure port 294 of the delay valve 288 is determined by the reversing relay 302 acting in conjunction with the pressure amplifier 310 and the sizing ring 318. Flow restrictor 312 connects the compressed air source 201 to the sizing ring 318 but limits the flow of the compressed air to a small amount. Consequently, when the orifices 320 of the sizing ring 318 are not blocked, the pressure that is coupled to input port 314 of pressure amplifier 310 will be relatively low. This will be the situation when the casing has started to be filled but has not yet begun to pass through the sizing ring 318.

The pressure amplifier 310 amplifies the pressure at its input port 314 and connects it to the control port 308 of the reversing relay 302. At this point, the pressure at the control port 308 of the reversing relay 302 will be relatively low.

Reversing relay 302 couples the pressure of compressed air source 201 present at its input port 304 to its output port 306 and decreases that pressure inversely with respect to the pressure at its control port 308. Consequently, as the pressure at the control port 308 rises, the pressure at the output port 306 will fall.

Since the pressure at control port 308 is relatively low to begin with, reversing relay 302 provides a high pressure at its output port 306. Since the delay valve 288 has been shifted to its "B" position, the output port 306 of the reversing relay 302 will be coupled through the delay valve 288 to the input port 278 of the shuttle valve 274.

In order for the sizing ring 318 to always control the size when delay valve 288 is in its "B" position, the pressure at the output port 306 of the reversing relay 302 must always be higher than the pressure at the output port 286 of the regulator 282. Consequently, the pressure at the input port 278 of the shuttle valve 274 will be higher than the regulated pressure at the input port 276. Shuttle valve 274 will therefore shift to connect the input port 278 to its output 280. The pressure at the output port 306 of the reversing relay 302 is coupled through the delay valve 288, the shuttle valve 274, and the pilot valve 250 to the port 268 of cylinder sleeve 266. The pressure at the output port 306 of reversing relay 302 is now controlling the inflation of the drag member 324.

Since the casing in the sizing ring 318 is at its minimum size at this point, the pressure output of reversing relay 302 will be at its maximum expanding the drag member 324 to its largest size. This creates the maximum resistive force against the casing 328 to cause it to begin to expand to its maximum size.

As the size of the filled casing 328 moving through the sizing ring 318 expands sufficiently to restrict flow through the orifices 320, a pressure increase will occur in the sizing ring 318. The increased pressure will be coupled through the pressure port 322 of the sizing ring 328 to the input port 314 of the pressure amplifier 310. Pressure amplifier 310 will amplify this pressure so that a relatively high pressure is now provided to the control port 308 of the reversing relay 302.

Reversing relay 302, sensing the higher pressure at its control port 308, responds by decreasing the pressure at its output port 306. Since this pressure is expanding drag member 324, the drag member 324 will deflate somewhat, lowering the force resisting the movement of the casing 328, thereby decreasing the size of the casing 328. The size of the casing 328 will therefore be kept uniformly constant and have a diameter approximately equal to the inside diameter of the sizing ring 318. The size of the filled casing 328 is determined by the selection of an appropriate sizing ring 318.

Minor adjustments in size can be made by increasing or decreasing flow through the flow restrictor 312. Increasing the air flow allows reduction in filled product size because back pressure increases at port 322. Conversely, decreasing air flow allows an increase in filled product size because the orifices 320 must be approached more closely to maintain back pressure at port 320.

It will be appreciated that various modifications may be made to the embodiments described above without departing from the scope of the present invention. For example, control system 200 may be modified for use in conjunction with the embodiments shown in FIGS. 1, 2, and 3.

What is claimed is:

1. An apparatus for controlling the size of a casing filled with emulsion in an automatic stuffing machine of the type having a stuffing horn providing a passage therethrough, the horn having a first end for receiving an emulsion, an open second end, and an outer surface adapted to receive a casing sleeved thereover, the casing having a closed end and an open end receiving the second end of the stuffing horn, and means for forcing the emulsion through the horn into the casing, the casing being moved axially along the outer surface of the stuffing horn in response to the emulsion forcing means to allow radial expansion of the casing as it is filled with emulsion, the apparatus comprising an expandable and contractable elastomeric drag member circumferentially disposed about the horn, having an elastomeric drag surface which is radially contractable to a position proximate or below the outer surface of the horn and expandable to a position contacting the inner surface of the casing, fluid supply means for expanding and contracting the elastomeric drag member so that the drag surface contacts and exerts a force against the inner surface of the casing in opposition to movement of the casing, and control means for controlling the fluid supply to the drag member to expand and contract the elastomeric drag surface and to vary the force applied by the drag surface against the casing inner surface, thereby to control the radial expansion and playout of the casing as it is being filled with emulsion.

2. The apparatus of claim 1 wherein the expanding means includes pressurized fluid supply means and means for coupling the fluid supply means to the drag member, and the control means includes fluid pressure regulating means for regulating the fluid pressure supplied to the drag member to vary the force against the inner surface of the casing.

3. The apparatus of claim 2 wherein the control means further includes means for creating a vacuum in the coupling means to cause the drag member to collapse.

4. The apparatus of claim 2 wherein the control means further includes feedback means for controlling the expansion of the drag member in response to expansion of the casing as it is being filled with emulsion.

5. The apparatus of claim 4 wherein the feedback means includes a fluid chamber having a radially inner surface at least partially encircling the casing, means for mounting the fluid chamber adjacent to the second end of the stuffing horn, means for coupling the fluid chamber to the fluid supply means, at least one orifice in the radially inner surface for directing pressurized fluid toward the casing, and sensing means for sensing fluid pressure in the fluid chamber to regulate expansion of the drag member.

6. The apparatus of claim 5 further comprising reaction means adjacent to the drag member for engaging an outer surface of the casing in response to expansion of the drag member to increase the drag force on the casing.

7. The apparatus of claim 2 wherein the drag member includes a flexible element encircling the stuffing horn, a cylindrical sleeve over the stuffing horn, first means sealably connecting an edge of the flexible element to the stuffing horn, second means sealably connecting another edge of the flexible element to the sleeve, the sleeve having an inner diameter slightly greater than the outer diameter of the stuffing horn to provie a fluid passage between the flexible element and the means coupling the fluid supply means to the drag member.

8. The apparatus of claim 7 wherein the means coupling the fluid supply means to the drag member includes a piston and cylinder mechanism for moving the sleeve to assist expansion and collapse of the flexible element in response to the pressurized fluid.

9. An automatic stuffing machine comprising a stuffing horn providing a passage therethrough, the horn having a first end for receiving an emulsion, and open second end, and an outer surface adapted to receive a casing sleeved thereover, the casing having a closed end and an open end receiving the second end of the stuffing horn, means for forcing the emulsion through the horn into the casing to fill the casing with the emulsion, the casing being moved axially along the stuffing horn in response to the emulsion forcing means to allow radial epxansion of the casing as it is filled with emulsion, an expandable and contractable elastomeric drag member circumferentially disposed proximate or below the outer surface of the stuffing horn, the drag member having an expandable and contractable drag surface, fluid supply means for expanding and contracting the elastomeric drag member so that the drag surface contacts and exerts a force against the inner surface of the casing in opposition to movement of the casing, and control means for controlling the fluid supply to the drag member to expand and contract the elastomeric drag surface and to vary the force applied by the drag surface against the casing inner surface, thereby to control the radial expansion and playout of the casing as it is being filled with emulsion.

10. An automatic stuffing machine comprising a stuffing horn providing a passage therethrough, the horn having a first end for receiving an emulsion, an open second end, and an outer surface adapted to receive a casing sleeved thereover, the casing having a closed end and an open end receiving the second end of the stuffing horn, means for forcing the emulsion through the horn into the casing to fill the casing with the emulsion, the casing being moved axially along the stuffing horn in response to the emulsion forcing means to allow radial expansion of the casing as it is filled with emulsion, an expandable and contractable elastomeric drag member circumferentially disposed proximate or below the outer surface of the stuffing horn, the drag member having an expandable and contractable drag surface, fluid supply means for expanding and contracting the elastomeric drag member so that the drag surface contacts and exerts a force against the inner surface of the casing in opposition to movement of the casing, and control means for controlling the fluid supply to the drag member to expand and contract the elastomeric drag surface and to vary the force applied by the drag surface against the casing inner surface, the control means including feedback means for controlling the expansion of the drag member in response to the radial expansion of the casing as it is being filled with emulsion to control the size of the casing.

* * * * *